(12) United States Patent
Ohki et al.

(10) Patent No.: US 6,456,369 B1
(45) Date of Patent: Sep. 24, 2002

(54) MULTI-CORE OPTICAL FIBER INSPECTING METHOD AND APPARATUS

(75) Inventors: Kazuhiro Ohki, Tokyo (JP); Rikihiro Iida, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/491,157

(22) Filed: Jan. 26, 2000

(30) Foreign Application Priority Data

Jan. 29, 1999 (JP) .......................... 11-023164
Feb. 26, 1999 (JP) .......................... 11-051945

(51) Int. Cl.⁷ ............................................. G01N 21/00
(52) U.S. Cl. ...................................... 356/73.1; 385/116
(58) Field of Search ........................ 356/73.1; 385/116, 385/15, 45, 33, 35, 88, 49

(56) References Cited

U.S. PATENT DOCUMENTS 5,215,489 A * 6/1993 Nakamura .................. 385/119
5,375,179 A * 12/1994 Shaar et al. ................ 382/204
5,666,450 A * 9/1997 Fujimura et al. ........... 359/900
5,787,215 A * 7/1998 Kuhara et al. .............. 359/115
6,034,779 A * 3/2000 Yamaura .................... 356/614

* cited by examiner

*Primary Examiner*—Frank G. Font
*Assistant Examiner*—Tu T. Nguyen
(74) *Attorney, Agent, or Firm*—Fish & Richardson P.C.

(57) ABSTRACT

An apparatus for inspecting a multi-core optical fiber having a plurality of cores arranged in one plane includes a light source 10 having a plurality of optical output terminals which are connected to the incident ends of the respective cores of the multi-core optical fiber and used for putting optical signals into the respective cores thereof; optical signal taking means (12 and 14) for taking out the optical signal emitted from the emission end of each core of the multi-core optical fiber in a time series mode according to the alignment order of emission-side cores of the multi-core optical fiber; optical signal detecting means (16 and 18) for detecting the optical signal thus taken out by the optical signal taking means; and signal processing means 20 for verifying core numbers of the respective cores of the multi-core optical fiber on the basis of the signal patterns of detection outputs of the optical signal detecting means.

6 Claims, 9 Drawing Sheets

PRIOR ART

FIG. 14

MULTI-CORE OPTICAL FIBER INSPECTING METHOD AND APPARATUS

BACKGROUND OF THE INVENTION

1. Field of the Invention

This invention relates to a multi-core optical fiber inspecting method and apparatus, and more particularly, to a multi-core optical fiber inspecting method and apparatus for confirming the coincidence between the alignment order of input-side cores of a multi-core optical fiber and the alignment order of output-side cores of the multi-core optical fiber for use as an optical communication medium, and for measuring a transmission loss of each core in one step.

2. Description of the Related Art

A multi-core optical fiber is prepared by aligning a plurality of optical fiber cores in the form of a tape in one plane. In the case of such a multi-core optical fiber, the alignment order of input-side cores is required to coincide with the alignment order of output-side cores Supposing that the alignment order of input-side cores is not coincident with the alignment order of output-side cores, it would be impossible to transmit optical signals to any target transmission line. However, the coincidence between the input and output core numbers needs confirming because nonconforming multi-core optical fibers in which the alignment order of input-side cores is not coincident with the alignment order of output-side cores are produced sometime during the process of manufacturing multi-core optical fibers.

In order to improve the production efficiency of multi-core optical fibers, moreover, it has also been required to measure the transmission loss of the optical fiber as its basic characteristic quickly without troublesome work.

Figure 14:
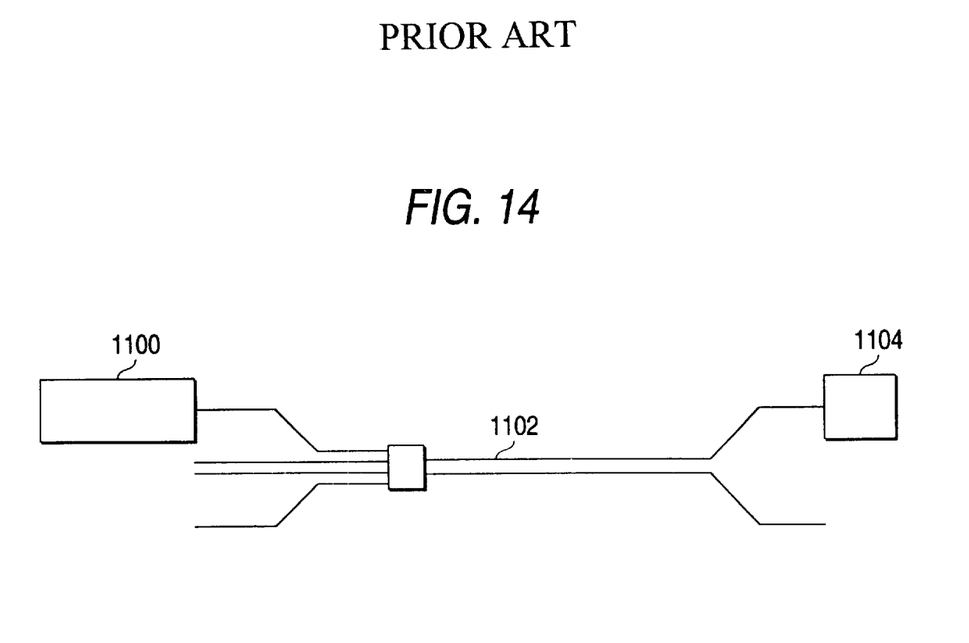
FIG. 14 is a block diagram of a multi-core optical fiber core-number verifying apparatus according to the conventional art.

A conventional method of verifying core numbers of multi-core optical fibers will be described with reference to FIG. 14 In FIG. 14, reference numeral 1100 denotes a light source; 1102, a multi-core optical fiber; and 1104, an optical power meter.

When core numbers of multi-core optical fibers are verified and when the transmission loss thereof is measured, the optical power meter 1104 has heretofore been used to measure output light from the emission end of each core of the multi-core optical fiber 1102 by putting the output of the light source 1100 into the incident end core of the multi-core optical fiber 1102. For example, the optical output of the light source 1100 is put into the incident end of No. 1 core, whereupon the optical power meter 1104 is used to verify the power of the optical signal that is output from the emission end of the No.1 core.

In the conventional methods of verifying core numbers of multi-core optical fibers, one output end of the multi-core optical fiber 1102 is split into single cores, which are separately connected to the optical power meter 1104 for measuring purposes. Consequently, much time has been required to take an accurate measurement as extremely complicated preparations for such the measurement are needed. Moreover, there has been the possibility of making errors in verifying core numbers because the optical output of each core is measured by switching the connections between the light source and the input-side cores.

SUMMARY OF THE INVENTION

An object of the present invention made under the circumstances stated above is to provide a multi-core optical fiber inspecting method and apparatus for confirming the coincidence between the alignment order of input-side cores of a multi-core optical fiber and the alignment order of output-side cores of the multi-core optical fiber and for measuring the transmission loss of the optical fiber as its basic characteristic simply, quickly and accurately in one step.

In order to accomplish the object above, according to a first aspect of the present invention, there is provided a multi-core optical fiber inspecting method comprising the steps of putting an optical signal into each incident end core of a multi-core optical fiber having a plurality of cores arranged in one plane, taking out the optical signal emitted from the emission end of the core in a time series mode according to the alignment order of emission-side cores of the multi-core optical fiber, and verifying core numbers of the respective cores of the optical fiber on the basis of the signal patterns thus taken out in the time series mode. Therefore, the coincidence between the alignment order of the input-side cores of the multi-core optical fiber and the alignment order of the output-side cores thereof can be confirmed simply, quickly and accurately.

According to a second aspect of the present invention, when the core numbers of the respective cores of the multi-core optical fiber are verified, the power of each of the optical signals put into and emitted from the multi-core optical fiber is measured thereby to measure the transmission loss of the multi-core optical fiber. It is therefore possible to confirm the coincidence between the alignment order of the input-side cores of the multi-core optical fiber and the alignment order of the output-side cores thereof and to measure the transmission loss of the optical fiber as its basic characteristic in one step simply, quickly and accurately.

According to a third aspect of the present invention, there is provided a multi-core optical fiber inspecting apparatus, in which the multi-core optical fiber having the plurality of cores arranged in one plane, comprising: the light source having the plurality of optical output terminals which are connected to the incident ends of the respective cores of the multi-core optical fiber and used for putting optical signals into the respective cores thereof; the optical signal taking means for taking out the optical signal emitted from the emission end of each core of the multi-core optical fiber in the time series mode according to the alignment order of emission-side cores of the multi-core optical fiber; the optical signal detecting means for detecting the optical signal thus taken out by the optical signal taking means; and the signal processing means for verifying core numbers of the respective cores of the multi-core optical fiber on the basis of the signal patterns of detection outputs of the optical signal detecting means. Therefore, the coincidence between the alignment order of the input-side cores of the multi-core optical fiber and the alignment order of the output-side cores thereof can be confirmed simply, quickly and accurately.

According to a fourth aspect of the present invention, in the multi-core optical fiber inspecting apparatus of the third aspect of the present invention, the optical signal taking means has the rotary plate formed with the opening of a size large enough to totally let pass all the optical signals emitted from the respective cores of the multi-core optical fiber, and the optical signal detecting means includes the light receiving element having an area large enough to collectively receive all the optical signals emitted from the respective cores of the multi-core optical fiber. It is therefore possible to confirm the coincidence between the alignment order of the input-side cores of the multi-core optical fiber and the alignment order of the output-side cores thereof and to measure the transmission loss of the optical fiber as its basic characteristic in one step simply, quickly and accurately.

According to a fifth aspect of the present invention, there is provided a multi-core optical fiber inspecting apparatus, in which the multi-core optical fiber having the plurality of cores arranged in one plane, comprising: the multi-output light source unit having the plurality of optical output terminals which are connected to the incident ends of the respective cores of the multi-core optical fiber and used for putting optical signals into the respective cores thereof; the rotary plate having at least one slit which is driven to rotate in such a way as to cross the optical beam emitted from the emission end of each core of the multi-core optical fiber; the optical signal detecting means for detecting the optical signal emitted from the emission end of each core of the multi-core optical fiber as the time series signal according to the alignment order of emission-side cores of the multi-core optical fiber; and the signal processing means for verifying core numbers of the respective cores of the multi-core optical fiber on the basis of the signal patterns of the time series signals emitted by the optical signal detecting means. Therefore, the coincidence between the alignment order of the input-side cores of the multi-core optical fiber and the alignment order of the output-side cores thereof can be confirmed simply, quickly and accurately.

According to a sixth aspect of the present invention, in the multi-core optical fiber inspecting apparatus of the fifth aspect of the present invention, the rotary plate has the opening other than the slit, the opening being large enough to let pass the optical beam outputs of all the cores of the multi-core optical fiber; the optical signal detecting means includes the large-diameter optical sensor capable of receiving the optical beam outputs of all the cores of the multi-core optical fiber; and the signal processing means obtains the transmission loss of the multi-core optical fiber on the basis of detection outputs of the optical sensor that has received the optical beam outputs of the multi-core optical fiber that have passed through the opening of the rotary plate. It is therefore possible to confirm the coincidence between the alignment order of the input-side cores of the multi-core optical fiber and the alignment order of the output-side cores thereof and to measure the transmission loss of the optical fiber as its basic characteristic in one step simply, quickly and accurately.

According to a seventh aspect of the present invention, as the signal processing means verifies the core number by measuring the time required until the slit passes the front of the emission end of each core of the multi-core optical fiber whose core number is to be verified after the slit passes through the optical path formed by the photocoupler, the core-to-core positional relationship of the multi-core optical fiber is determined with the position of the photocoupler thus disposed as a reference. Then there is sequentially created a condition in which the optical signal is produced in the time series mode from only the target core in order to verify its core number by measuring the time required until the slit passes the front of the emission end of the target core of the multi-core optical fiber 30 after it passes through the optical path formed by the photocoupler. Thus, the core number can be verified simply, quickly and accurately.

According to an eighth aspect of the present invention, in the multi-core optical fiber inspecting apparatus described in either the fifth or sixth aspect of the present invention, the multi-output light source unit is so arranged as to be able to control the level of the optical output put into each core of the multi-core optical fiber and to cut off only the optical output put into the core of the multi-core optical fiber whose core number is targeted for verification, and the signal processing means verifies the core number of the multi-core optical fiber on the basis of the signal pattern of the time series signal detected by the optical signal detecting means when the slit of the rotary plate passes the front of the emission end of each core of the multi-core optical fiber. Therefore, the coincidence between the alignment order of the input-side cores of the multi-core optical fiber and the alignment order of the output-side cores thereof can be confirmed simply, quickly and accurately.

According to a ninth aspect of the present invention, in the multi-core optical fiber inspecting apparatus described in either the fifth or sixth aspect of the present invention, the multi-output light source unit is so arranged as to be able to control the level of the optical output put into each core of the multi-core optical fiber and to increase or decrease only the optical output put into the core of the multi-core optical fiber whose core number is targeted for verification; the optical signal detecting means including: the photodiode for detecting the optical signal emitted from the emission end of each core of the multi-core optical fiber; the current-voltage converter circuit for converting the output current of the photodiode into a voltage signal; and two of the first and second comparator different in the reference voltage with the output signal of the current-voltage converter circuit as an input; the output condition of the first comparator is set as a condition for detecting the optical signals supplied from all the cores of the multi-core optical fiber; the output condition of the second comparator is set as a condition for detecting only the optical signal supplied from the core of the multi-core optical fiber whose core number is targeted for verification, and the signal processing means verifies the core number of the multi-core optical fiber on the basis of the outputs of the first and second comparators. Therefore, the coincidence between the alignment order of the input-side cores of the multi-core optical fiber and the alignment order of the output-side cores thereof can be confirmed simply, quickly and accurately.

According to a tenth aspect of the present invention, there is provided a multi-core optical fiber core-number verifying apparatus comprising:

a multi-output light source unit having a plurality of output terminals for use in putting optical signals from one end sides of the output terminals into the respective cores of a multi-core optical fiber;

light receiving means for detecting the optical signal emitted from the other end of each of the cores as an image; and emission-position monitoring means which is connected to the light receiving means and capable of recognizing any core from which the optical signal has been detected by processing image data obtainable from the light receiving means.

With the arrangement above, as the optical signals produced from the other ends of the respective cores can collectively be recognized as an image in the multi-core optical fiber core-number verifying apparatus, the work of verifying the output cores of the multi-core optical fiber separately becomes unnecessary.

According to an eleventh aspect of the present invention, there is provided a multi-core optical fiber core-number verifying apparatus of the tenth aspect of the present invention, wherein an infrared beam is used for the optical signal and that an infrared camera is used to form the light receiving means.

According to a twelfth aspect of the present invention, there is provided a multi-core optical fiber core-number verifying apparatus according to the tenth aspect of the present invention, wherein an infrared beam is used for the optical signal and that the light receiving means includes an infrared sensor plate for converting the infrared beam into visible light, and a camera for photographing the infrared sensor plate.

With the arrangements above, the utilization of infrared beams allows distinguishing between the cores clearly without any influence of external light in those aforementioned multi-core optical fiber core-number verifying apparatus.

According to the thirteenth aspect of the present invention, there is provided a multi-core optical fiber core-number verifying apparatus according to any one of the tenth to twelfth aspects of the present invention, wherein the multi-output light source unit includes at least one light source, and a light switching device capable of converting the output light of the light source into a plurality of output light beams.

According to a fourteenth aspect of the present invention, there is provided a multi-core optical fiber core-number verifying apparatus according to any one of the tenth to twelfth aspects of the present invention, wherein the multi-output light source unit has a plurality of light sources each capable of producing one output light beam.

With the arrangements above, putting the optical signals selectively into the respective cores of the multi-core optical fiber can be carried out easily and quickly in those aforementioned multi-core optical fiber core-number verifying apparatus.

According to a fifteenth aspect of the present invention, there is provided a multi-core optical fiber core-number verifying apparatus according to any one of the tenth to fourteenth aspects of the present invention, comprising:

input switching means which is connected to the multi-output light source unit and capable of controlling the multi-output light source unit as to switching cores to be fed with an optical signal, and core coincidence decision means which is connected to the input switching means and the emission-position monitoring means and used to decide whether or not the core targeted by the input switching means as what is fed with an optical signal coincides with the core from which an optical signal output has been detected by the emission-position monitoring means.

With the arrangement above, the work of confirming the coincidence between the alignment order of input cores and the alignment order of output cores can automatically be carried out in the multi-core optical fiber core-number verifying apparatus.

BRIEF DESCRIPTION OF THE DRAWINGS

Each of FIGS. 6A to 6D is a diagram illustrating the operating condition of a multi-core optical fiber inspecting apparatus according to a fourth embodiment of the invention.

DETAILED DESCRIPTION OF THE PRESENT INVENTION

Figure 1:
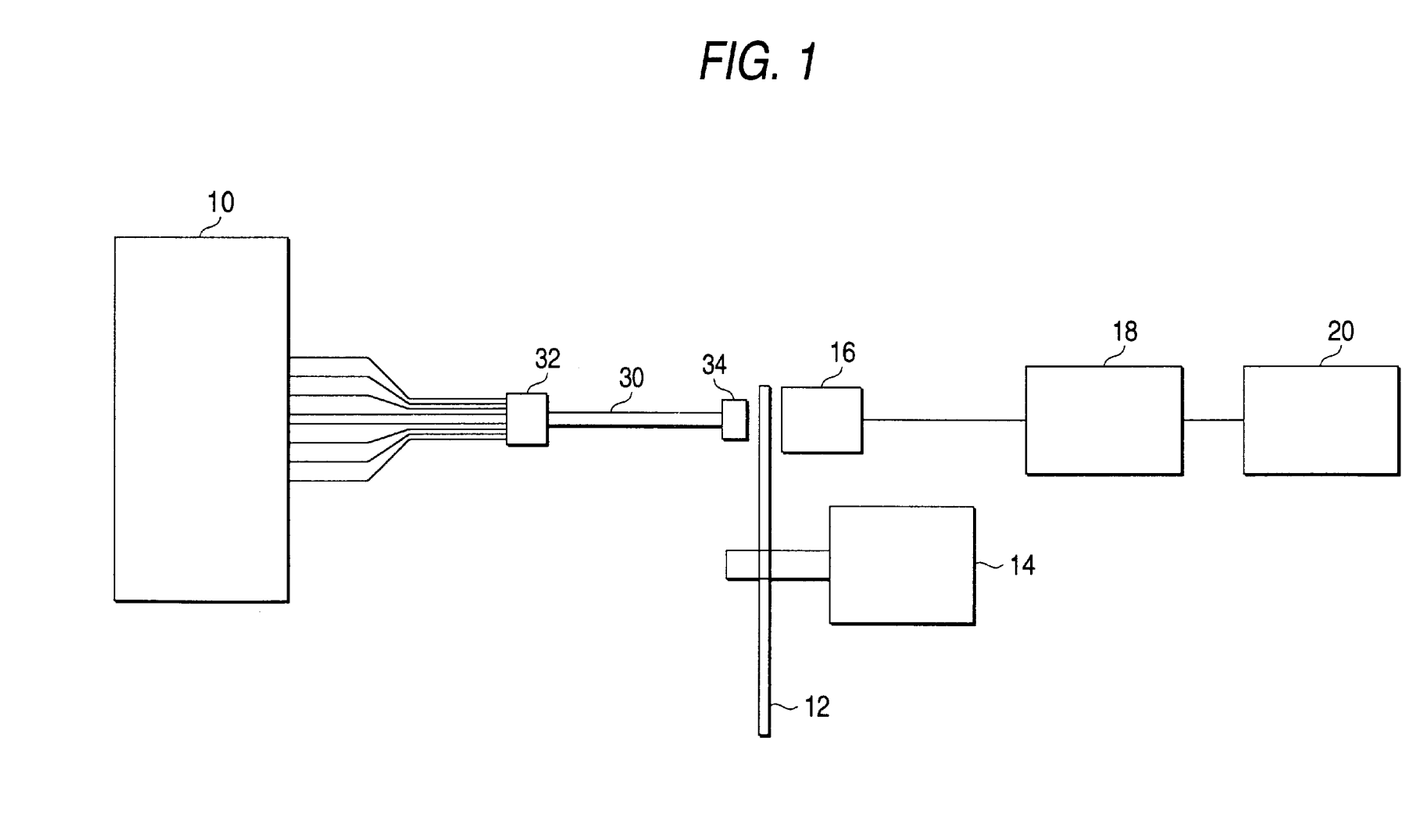
FIG. 1 is a block diagram showing a multi-core optical fiber inspecting apparatus according to a first embodiment of the invention.
Figure 2:
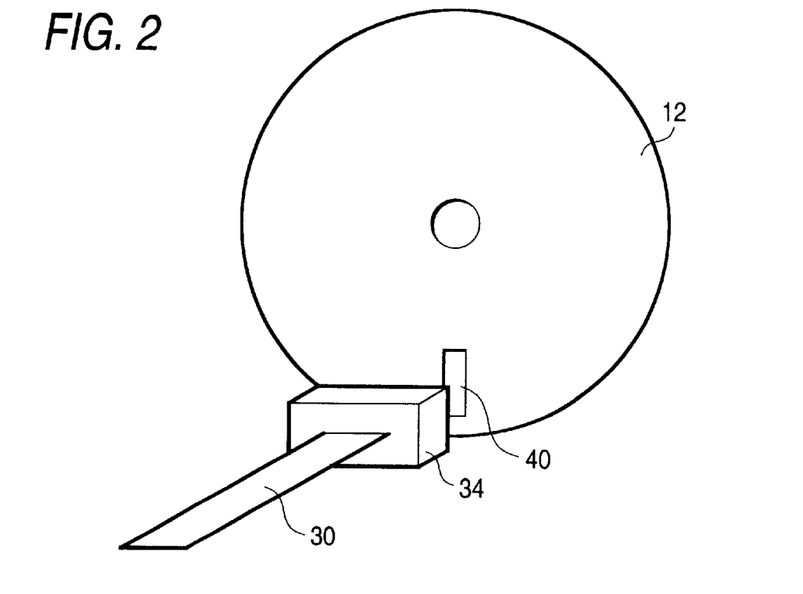
FIG. 2 is a diagram illustrating a rotary plate in the multi-core optical fiber inspecting apparatus of FIG. 1.

A detailed description of embodiments of the present invention will now be given with reference to the drawings. FIGS. 1 and 2 show a multi-core optical fiber inspecting apparatus as a first embodiment of the invention. In the multi-core optical fiber inspecting apparatus according to this embodiment of the invention, an optical signal is input to the incident end of each of the cores of a multi-core optical fiber having a plurality of cores arranged in one plane and the optical signals that are output from the respective emission ends of these cores are taken out in time series according to the alignment order, so that each of the core numbers is verified on the basis of the signal patterns thus taken out in time series.

As shown in FIG. 1, a multi-core optical fiber 30 has the plurality of cores arranged in one plane and both its ends are connected to connectors 32 and 34, respectively.

The multi-core optical fiber inspecting apparatus has a multi-output light source unit 10 having a plurality of optical output terminals that are connected to the incident ends of cores of the multi-core optical fiber 30 and a connector 32; a rotary plate 12 having a slit 40 for use in taking out signal patterns according to the alignment order of the emission-side cores of the multi-core optical fiber 30 as shown in FIG. 2; a motor 14 for driving the rotary plate 12 to rotate; an optical sensor 16 for receiving optical signals that are output from the emission-side cores of the multi-core optical fiber 30 and passed through the slit 40 of the rotary plate 12; a signal detecting unit 18 for detecting time series signals from the outputs detected by the optical sensor 16 according to the alignment order of the emission-side cores of the multi-core optical fiber 30; and a processing unit 20 for verifying the core numbers of the multi-core optical fiber 30 on the basis of the signal patterns of the detected outputs.

With the arrangement above, the rotary plate 12 having the slit 40 at least one place is rotated at even speed by the motor 14 when the coincidence between the alignment order of the input-side cores of the multi-core optical fiber and the alignment order of the output-side cores thereof is confirmed. In this case, an output variation is adopted of a core whose number is to be verified by the multi-output light source unit 10 connected to the input terminal of the connector 32 among the cores of the multi-core optical fiber 30. The processing unit 20 sequentially takes out each of the signals generated via the optical sensor 16 and the signal detecting unit 18 when the slit 40 formed in the rotary plate 12 crosses the front of each core of the multi-core optical fiber 30 so as to verify the core numbers of the multi-core optical fiber 30 by analyzing the patterns of these time series signals. According to the present invention, the multi-output light source unit 10 corresponds to a light source; the rotary plate 12 and the motor 14 to optical signal taking means; the optical sensor 16 and the signal detecting unit 18 to optical signal detecting means; and the processing unit 20 to a signal processing means.

According to the first embodiment of the invention, it is possible to confirm the coincidence between the alignment order of the input-side cores of the multi-core optical fiber and the alignment order of the output-side cores thereof simply, quickly and accurately.

A multi-core optical fiber inspecting apparatus as a second embodiment of the invention will now be described. What makes the multi-core optical fiber inspecting apparatus according to the second embodiment of the invention different from the multi-core optical fiber inspecting apparatus according to the first embodiment of the invention is only concerned with the rotary plate and the optical sensor, wherein as the rest of the arrangement is similar to that in the first embodiment, the repeated description thereof will be omitted. Measurement of the transmission loss of the optical fiber as its basic characteristic is always an important item necessary in production and inspection stages. According to this embodiment of the invention, it is intended to make possible the verification of core numbers of the multi-core optical fiber and measurement of the transmission loss of the multi-core optical fiber in one step.

Figure 3:
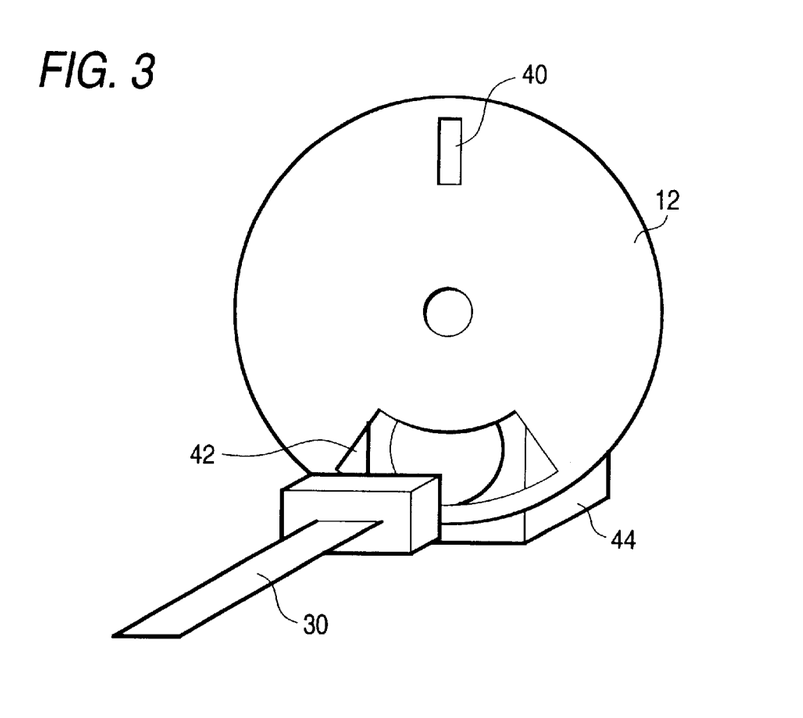
FIG. 3 is a diagram illustrating the principal part of a multi-core optical fiber inspecting apparatus according to a second embodiment of the invention.

FIG. 3 shows an arrangement of a rotary plate and an optical sensor. In order to measure the transmission loss of the multi-core optical fiber, a method of collectively measuring the plurality of outputs of the multi-core optical fiber is generally employed. According to this embodiment of the invention, there are provided as shown in FIG. 3 an opening 42 of a size large enough to totally let pass a plurality of optical outputs from the respective cores of the multi-core optical fiber 30 in the rotary plate 12, and a large-diameter optical sensor 44 capable of totally receiving the plurality of optical outputs from the multi-core optical fiber 30. According to this embodiment of the invention, the opening 42 provided in the rotary plate 12 is also stopped in a position where all the optical signals emitted from the respective cores of multi-core optical fiber 30 can pass therethrough when the transmission loss of the multi-core optical fiber 30 is measured. In other words, the transmission loss of the multi-core optical fiber 30 is obtained by receiving the plurality of optical signals with the large-diameter optical sensor 44.

Measurement of the transmission loss of the multi-core optical fiber is intended to clarify loss of light per unit length by measuring the transmission loss of an optical fiber having a known length. In other words, the incident light power and emission light power of a target optical fiber needs measuring. According to this embodiment of the invention, the optical power is measured twice, that is, measurement of the optical power is made on both the emission and incident sides of the optical fiber. Measurement of the optical power on the emission side of the optical fiber and then measurement of the optical fiber on the incidence side thereof in order are generally considered highly reliable and called a cutback method.

According to the second embodiment of the invention, it is possible to confirm the coincidence between the alignment order of the input-side cores of the multi-core optical fiber and the alignment order of the output-side cores thereof and to measure the transmission loss of the optical fiber as its basic characteristic in one step simply, quickly and accurately.

Figure 4:
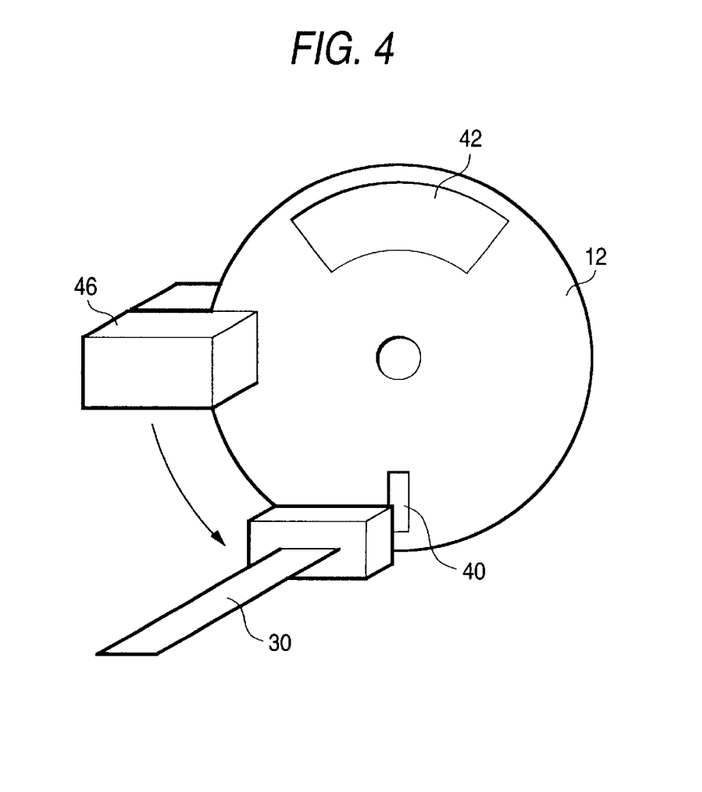
FIG. 4 is a diagram illustrating the principal part of a multi-core optical fiber inspecting apparatus according to a third embodiment of the invention.

A multi-core optical fiber inspecting apparatus as a third embodiment of the invention will be described. What makes the multi-core optical fiber inspecting apparatus according to this embodiment of the invention different from the multi-core optical fiber inspecting apparatus according to the second embodiment of the invention is that a photocoupler 46 for generating a reference signal for use in detecting the position of each core of the multi-core optical fiber 30 is as shown in FIG. 4 disposed in a position where the slit 40 formed in the rotary plate 12 crosses the optical path formed by the photocoupler 46 when the slit 40 rotates, wherein as the rest of the arrangement is similar to that in the second embodiment, the repeated description thereof will be omitted.

The multi-core optical fiber inspecting apparatus according to this embodiment of the invention is adapted to verify each core number by measuring the time required until the slit 40 formed in the rotary plate 12 passes the front of that emission-side core of the multi-core optical fiber 30 after the slit 40 passes through the optical path formed by the photocoupler 46.

Figure 5:
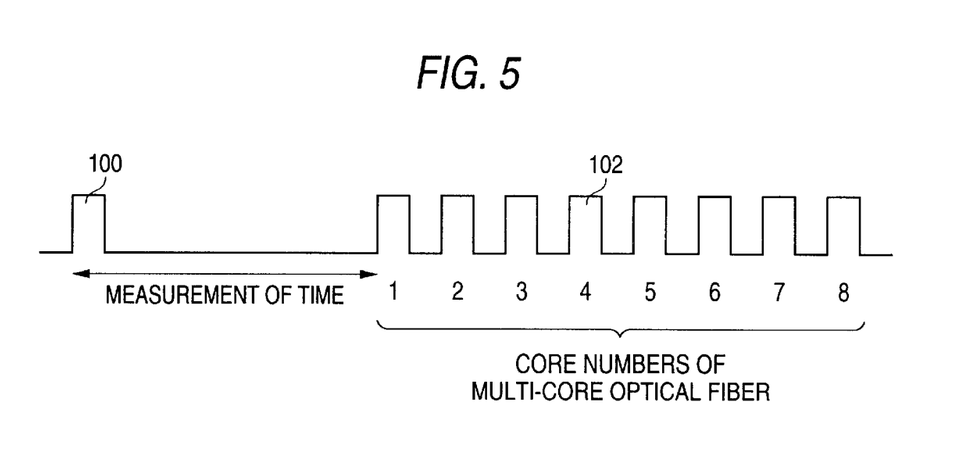
FIG. 5 is a diagram illustrating the operating condition of the multi-core optical fiber inspecting apparatus according to the third embodiment of the invention.

The photocoupler 46 is disposed in the position set to make the slit 40 formed in the rotary plate 12 previously cross the multi-core optical fiber 30 so as to detect the timing at which the slit 40 crosses the multi-core optical fiber 30. More specifically, there is set a condition wherein optical signals are emitted from all the cores of the multi-core optical fiber 30. When the slit 40 formed in the rotary plate 12 crosses the optical path formed by the photocoupler 46, a photocoupler output signal 100 is produced as shown in FIG. 5. Whenever the slit 40 crosses the front of each emission-side core of the multi-core optical fiber 30 immediately after the signal 100 is emitted, a multi-core optical fiber output signal 102 is sequentially produced.

Thus, the core-to-core positional relationship of a multi-core optical fiber 30 is made known with the position of the photocoupler 46 thus disposed as a reference by measuring the time required between a point of time at which the photocoupler output signal 100 is produced and a point of time at which the multi-core optical fiber output signal 102 is produced.

Subsequently, there is sequentially created a condition wherein an optical signal is produced from only a target core in order to verify its core number by measuring the time required until the slit 40 passes the target core of the multi-core optical fiber 30 after it passes through the optical path formed by the photocoupler 46.

According to the third embodiment of the invention, it is possible to confirm the coincidence between the alignment order of the input-side cores of the multi-core optical fiber and the alignment order of the output-side cores thereof simply, quickly and accurately.

A multi-core optical fiber inspecting apparatus as a fourth embodiment of the invention will now be described with reference to FIG. 6. This embodiment of the invention is intended to realize a specific measurement method for verifying core numbers of multi-core optical fibers, and an apparatus therefor may be arranged according to any one of the first to third embodiments. However, the repeated description of such apparatus will be omitted.

Figures 6A, 6B, 6C:
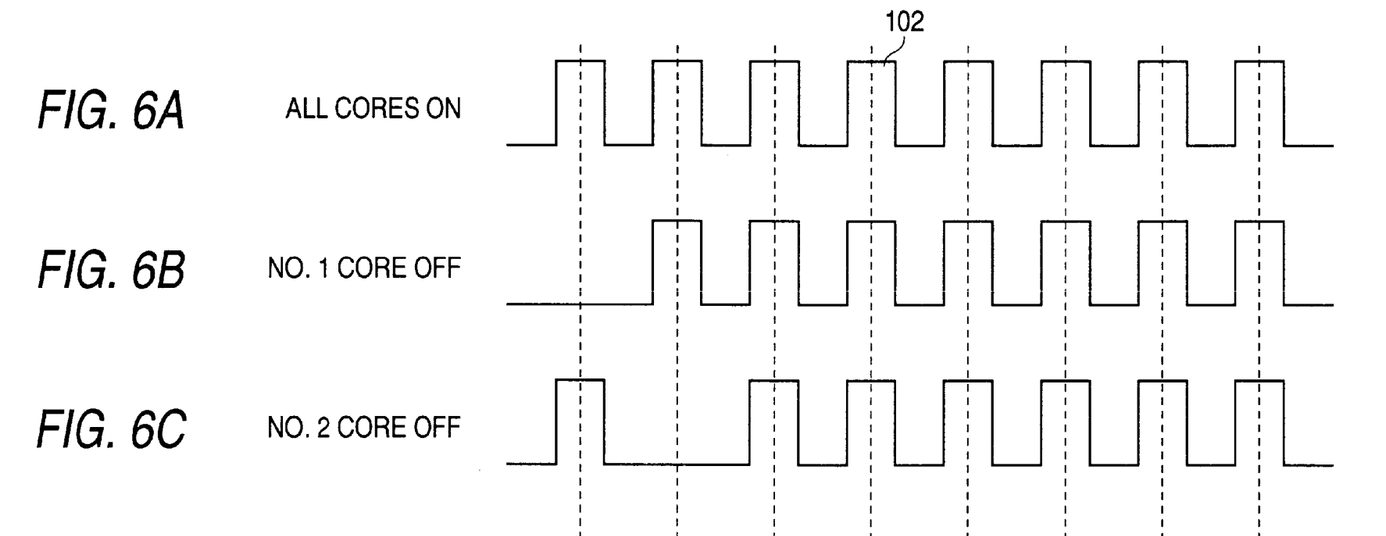
Figure 6D:
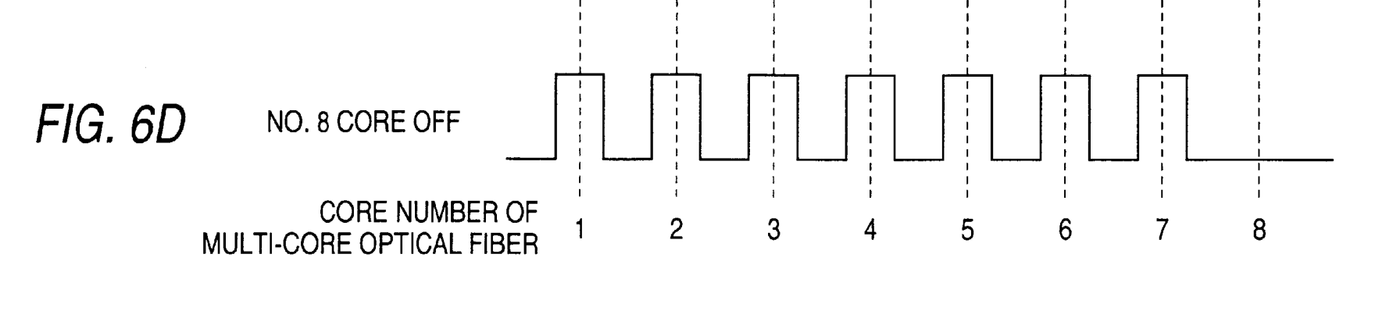

FIGS. 6A to 6D show patterns of optical signals to be produced in time series from the respective cores of the multi-core optical fiber 30 at the time of verifying the core numbers. In FIGS. 6A to 6D, reference numeral 102 denotes a multi-core optical fiber output signal. FIG. 6A shows a condition wherein the whole core is in an on state, that is, optical signals are being emitted from the respective cores of the multi-core optical fiber 30. Further, FIGS. 6B, 6C and 6D refer to cases where No. 1 core, No. 2 core and No. 8 core have been shut out from the optical outputs of the multi-output light source unit 10.

The operation of the multi-core optical fiber inspecting apparatus in each embodiment of the invention will be described below. In the condition wherein the whole core is in the on state first, the multi-core optical fiber output signal 102 corresponding to each core is observed when the slit 40 passes the front of each emission-side core of the multi-core optical fiber 30. When the whole core is in the on state, a string of multi-core optical fiber output signals 102 equal to the number of cores of a multi-core optical fiber to be checked are obtained, whereby the normal connected condition of the whole core is verified. FIGS. 6A to 6D show an example of the multi-core optical fiber 30 having eight cores. Hereinafter, a description will be given of the multi-core optical fiber 30 by taking a case of a 8-core optical fiber by way of example.

Then only the optical signal put by the multi-output light source unit 10 into the target core (the number of which is targeted for verification) of the multi-core optical fiber 30 is turned off and the multi-core optical fiber output signal 102 corresponding to each core is observed when the slit 40 formed in the rotary plate 12 passes the front of each emission-side core of the multi-core optical fiber 30. If the alignment order of the cores of the multi-core optical fiber 30 is observed to be normal, that is, if there is the coincidence between the input and output sides, seven consecutive signals will be obtained when No. 1 core is held 'off'; seven signals with the absence of No. 2 signal will be obtained when the No. 2 core is held 'off'; and seven consecutive signals will be obtained when No. 8 core is held 'off.'

According to the fourth embodiment of the invention, since only the signal produced from the core (the number of which is targeted for verification) of the multi-core optical fiber is absent, the alignment order of the cores of the multi-core optical fiber can be verified. If, however, No. 1 core and No. 8 core change places with No. 8 core and No. 1 core on the respective incident- and emission-sides, the core numbers of the multi-core optical fiber will not be verifiable because the same multi-core optical fiber output signal 102 is observed. In a case where No. 1 core replaces only No. 8 core, verification of that case is made by, for example, turning off the optical signal supplied from the multi-output light source unit 10 to No. 8 core and No. 2 core. Although No. 2 signal and No. 8 signal are absent in the normal operation, six consecutive signals are obtainable when these signals change places with each other. In summary, it is possible to verify whether the alignment order of the whole core is normal or not.

Figure 7:
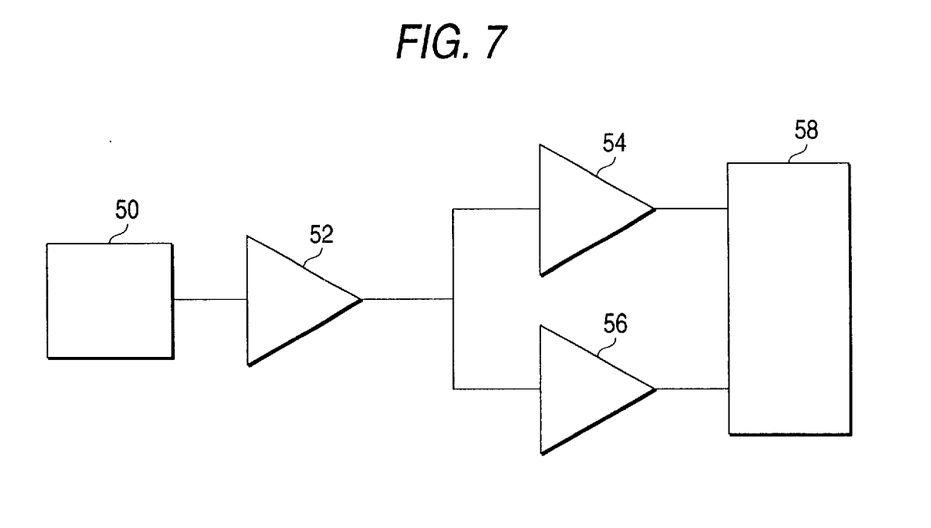
FIG. 7 is a block diagram showing the principal part of a multi-core optical fiber inspecting apparatus according to a fifth embodiment of the invention.
Figure 8:
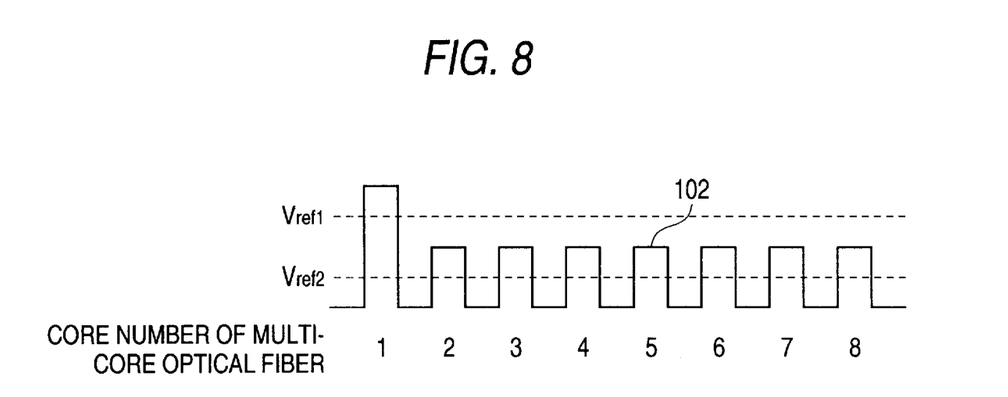
FIG. 8 is a diagram illustrating the operating condition of the multi-core optical fiber inspecting apparatus shown in FIG. 7.

A multi-core optical fiber inspecting apparatus as a fifth embodiment of the invention will now be described with reference to FIGS. 7 and 8. In this embodiment of the invention, there is shown an example of a specific multi-core optical fiber inspecting apparatus according to the first embodiment of the invention. FIG. 7 shows a specific arrangement of the optical sensor 16, the signal detecting unit 18 and the processing unit 20 in FIG. 1. As shown in FIG. 7, a detecting system in the multi-core optical fiber inspecting apparatus has a photodiode 50 for detecting the optical signal emitted from the emission end of each core of the multi-core optical fiber 30, a current-voltage converter circuit 52 for converting the output current of the photodiode 50 into a voltage signal, a first and a second comparator 54 and 56 different in the reference voltage with the output signal of the current-voltage converter circuit 52 as an input, and a microprocessor 58 for verifying the core numbers of the multi-core optical fiber 30 based on the outputs of the two first and second comparators 54 and 56. In this case, the photodiode 50 corresponds to the optical sensor 16 in FIG. 1; the current-voltage converter circuit 52, and the first and second comparators 54 and 56 to the signal detecting unit 18 in FIG. 1; and the microprocessor 58 to the processing unit 20 in FIG. 1.

The multi-output light source unit 10 in FIG. 1 is so arranged as to be able to control the level of the optical output put into each core of the multi-core optical fiber 30 and to increase or decrease only the optical output put into the core of the multi-core optical fiber 30 whose core number is targeted for verification.

The output condition of the first comparator 54 is set as a condition for detecting the optical signals supplied from all the cores of the multi-core optical fiber 30. The output condition of the second comparator 56 is set as a condition for detecting only the optical signal supplied from the core of the multi-core optical fiber 30 whose core number is targeted for verification.

With the arrangement above, the photodiode 50 outputs the optical signal as a current signal. The current signal produced from the photodiode 50 is put into the current-voltage converter circuit 52 and emitted as the voltage signal. The output of the current-voltage converter circuit 52 branches off into two, which are respectively supplied to the comparators 54 and 56. The outputs of the comparators 54 and 56 are supplied to the microprocessor 58. The microprocessor 58 analyzes the signals received from the comparators 54 and 56 on the basis of signal patterns of the time series signals thus received and verifies the core number of the multi-core optical fiber 7.

More specifically, as in the fourth embodiment of the invention, there is provided a method of observing multi-core optical fiber output signals 102 corresponding to the respective cores when the slit 40 formed in the rotary plate 12 passes the front of each emission-side core of the multi-core optical fiber 30. FIG. 8 shows an example of the 8-core optical fiber. This embodiment of the invention is characterized in that the reference voltage ref1 of the comparator 54 is differentiated from the reference voltage ref2 of the comparator 56. FIG. 8 indicates an example of a case where the optical output of only a core to be checked is increased.

First, the multi-output light source unit 10 is set so that an optical output at a predetermined level or higher may be produced from all the cores of the multi-core optical fiber 30. The level of the optical output is set to exceed the reference voltage Vref2 of the comparator 56.

With the setting above, the comparator 56 outputs a timing signal at which the slit 40 passes the front of each emission-side core of the multi-core optical fiber 30. In this case, only the optical output of a core to be checked is set to exceed the reference voltage Vref1 of the comparator 54 and the timing signal of the comparator 56 is simultaneously observed. Then the microprocessor 58 is operated to analyze the pattern of the timing signal to ensure that the core numbers of the multi-core optical fiber 30 are rendered verifiable.

According to the fifth embodiment of the invention, it is possible to confirm the coincidence between the alignment order of the input-side cores of the multi-core optical fiber and the alignment order of the output-side cores thereof simply, quickly and accurately.

A multi-core optical fiber inspecting apparatus as a sixth embodiment of the invention will now be described with reference to FIG. 9.

Figure 9:
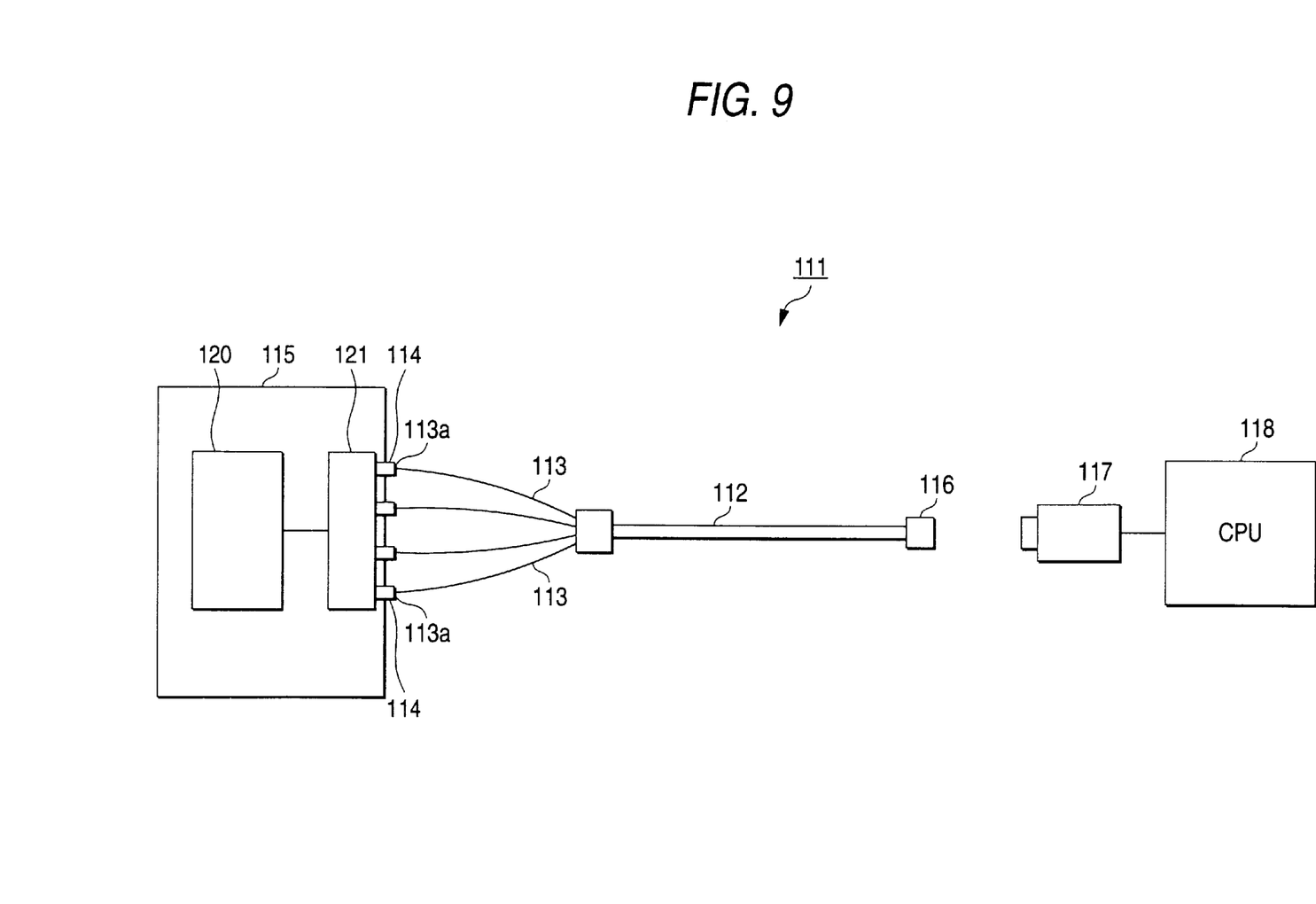
FIG. 9 is a functional block diagram of a multi-core optical fiber core-number verifying apparatus as an exemplary embodiment of the invention.

FIG. 9 shows an exemplary embodiment of the invention, wherein reference numeral 111 denotes a multi-core optical fiber core-number verifying apparatus. The multi-core optical fiber core-number verifying apparatus 111 essentially comprises a multi-output light source unit 115 having a plurality of output terminals 114, etc, that are respectively capable of putting infrared beams (light signals) via one ends 113a, etc, into the respective cores 113, etc, of a multi-core optical fiber 112, an infrared camera (a light receiving means) 117 for monitoring the output edge face 116 of the multi-core optical fiber 112 where the other ends of the respective cores 113, etc, are arranged, and a CPU 118 for processing the image data photographed by the infrared camera 117.

The multi-output light source unit 115 includes a light source 120 for outputting a wavelength band in a near-infrared range used in communications, and a light switching device 121 for switching the output light beams of the light source 120 to the respective output terminals 114, etc.

The CPU 118 processes the image data from the infrared camera 117 so as to recognize any one of the cores 113, etc, on the output edge face 116 from which the infrared beam is emitted, the CPU 118 being equivalent to an emission-position monitoring means as described in claims according to the present invention.

When the coincidence between the alignment order of input cores of the multi-core optical fiber and the alignment order of output cores thereof is confirmed by the multi-core optical fiber core-number verifying apparatus 111 according to this embodiment of the invention, the outputs of the output terminals 114, etc, are switched from one to another by the light switching device 121 in the alignment order of input cores of the multi-core optical fiber 112. When the alignment order of input cores of the multi-core optical fiber coincides with the alignment order of output cores thereof, the emission positions on the emission edge face of the multi-core optical fiber 112 photographed by the infrared camera 117 are sequentially shifted in the alignment order. The information obtained thereby is processed by the CPU 118, so that the coincidence between the alignment order of the input cores and the alignment order of the output cores is confirmed.

Supposing that the alignment order of input cores of the multi-core optical fiber 112 is not coincident with the alignment order of output cores thereof, the CPU 118 will not be able to verify the sequential shifting of the emission-positions on the emission edge face 116 of the multi-core optical fiber 112, whereby the multi-core optical fiber 112 in question can be decided to be nonconforming.

Infrared beams can be put into the respective cores 113, etc, of the multi-core optical fiber 12 by the multi-output light source unit 115 of the aforementioned multi-core optical fiber core-number verifying apparatus 111. The outputs of the respective cores 113, etc, of the multi-core optical fiber 112 are photographed by the infrared camera 117 and the image thus obtained from the infrared camera 117 is processed by the CPU 118 so as to recognize any one of the cores 113, etc, on the output edge face 116 from which the infrared beam is emitted. Consequently, the output light beams from the output edge face 116 can collectively be recognized from the image, and this arrangement is different from the conventional arrangement and makes unnecessary the work of verifying the output cores of the multi-core optical fiber separately. It is therefore possible to facilitate, and shorten the time required for, the verifying work and also to reduce the possibility of erroneously verifying the core numbers.

Since infrared beams are used as light put into the multi-core optical fiber 112 and detected by the infrared camera 117 in the multi-core optical fiber core-number verifying apparatus 111, the utilization of infrared beams allows distinguishing between the positions of the cores 113, etc, clearly from the image data photographed without any influence of external light or the like and this results in improving measurement accuracy.

Moreover, since the multi-output light source unit 115 is formed with the light source 120 and the light switching device 121 capable of switching the output light of the light source 120 into the plurality of output light beams, putting the optical signals selectively into the respective cores 113, etc, of the multi-core optical fiber 112 can be carried out easily and quickly, whereby measurement time can be shortened further.

While one preferred form of the invention has been described, it is to be understood that any other form thereof may be adopted without departing from the spirit and scope thereof if it is necessary.

Figure 10:
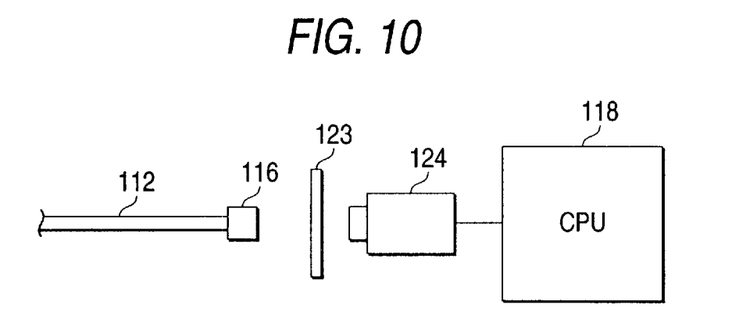
FIG. 10 is a functional block diagram of another embodiment in the multi-core optical fiber core-number verifying apparatus shown in FIG. 9.
Figure 11:
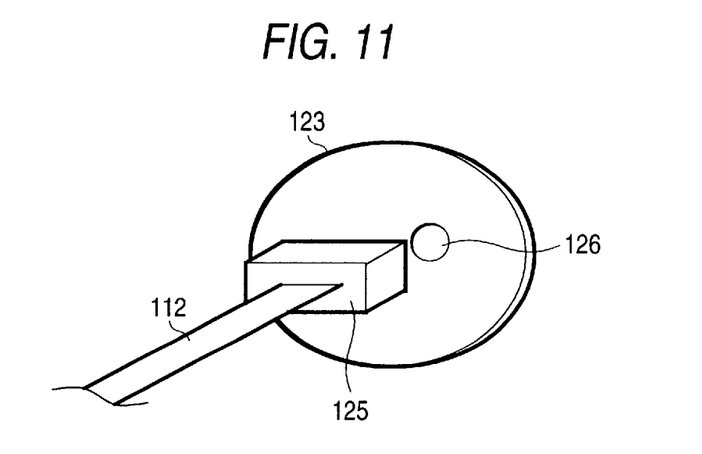
FIG. 11 is a perspective view of an exemplary condition in which output light of a multi-core optical fiber is detected in the multi-core optical fiber core-number verifying apparatus shown in FIG. 10

In place of the infrared camera 117 in the above-described embodiment, for example, a CCD camera (camera) 124 may be disposed opposite to the output edge face 116 of the multi-core optical fiber 112 with an infrared sensor plate 123 held therebetween in order that the image data photographed by the CCD camera 124 may be processed by the CPU 118 as shown in FIG. 10. In this case, assuming the output portion of the multi-core optical fiber 112 is in the form of a multi-core connector 125 as shown in FIG. 11, the light produced from the multi-core connector 125 is emitted onto the infrared sensor plate 123. The light thus emitted gives visible light to the place shone like a light beam image 126 of FIG. 11. On the edge face of the multi-core connector 125 as the output portion of the multi-core optical fiber 112, optical fibers are aligned at intervals of 250 $\mu$m and the light beam emitted from each core is used to shine different sections of the infrared sensor plate 123. Therefore, the alignment order of output cores of the multi-core optical fiber 112 is made verifiable by monitoring the movement of the light beam image 126 projected onto the infrared sensor plate 123. Thus, the same effect as that in the above-described embodiment becomes achievable.

Figure 12:
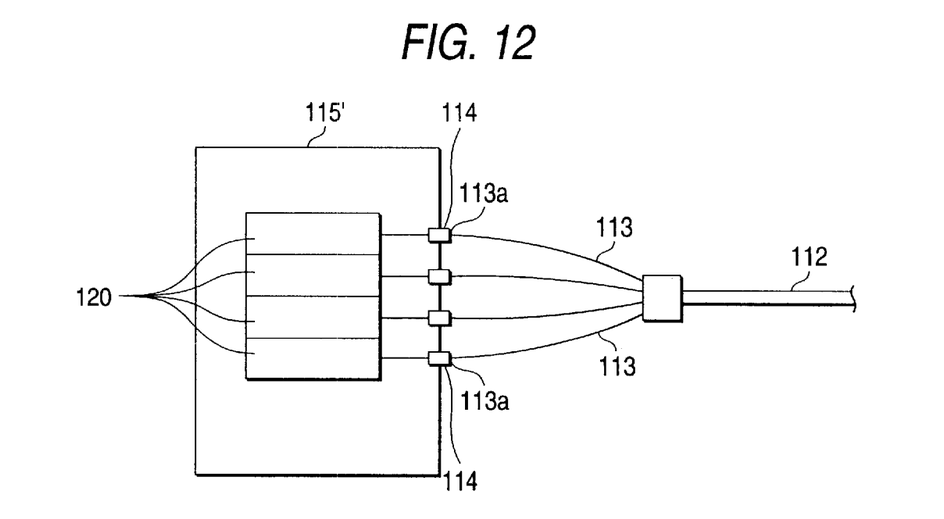
FIG. 12 is a functional block diagram of another embodiment of the multi-output light source unit of the multi-core optical fiber core-number verifying apparatus shown in FIG. 9.

In place of the multi-output light source unit 115 in the above-described embodiment, moreover, there may be adopted a multi- output light source unit 115' for emitting output light beams of the plurality of light sources 120, etc, from the respective output terminals 114 as shown in FIG. 12.

Figure 13:
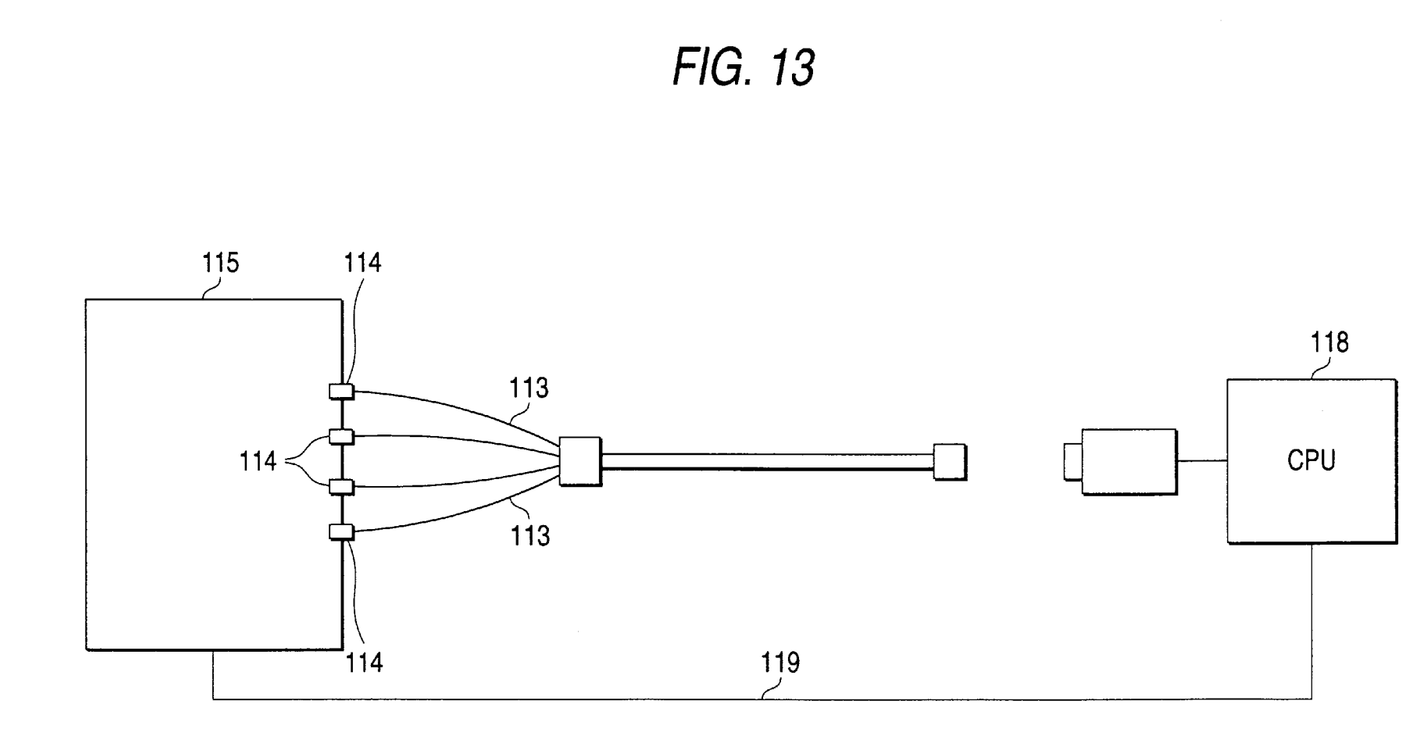
FIG. 13 is a functional block diagram of a multi-core optical fiber core-number verifying apparatus as another exemplary embodiment of the invention.

As in a multi-core optical fiber core-number verifying apparatus 111' of FIG. 13, further, a communication means 119 may be used to connect the multi-output light source unit 115 and the CPU 18 so as to make the CPU 118 operate to switch output terminals 114, . . . in the multi-output light source unit 115. In this case, GP—IB (a standard interface bus according to the IEEE-488 standards), for example, may be used as the communication means 119.

In that case, the CPU 118 is made to function as an input switching means for switching cores 113, etc, to be fed with the optical signal on the part of the multi-output light source unit 115 and also to function as a core coincidence decision means for confirming the coincidence between a target core 113 to be fed with the optical signal from the multi-output light source unit 115 and the core 113 whose output position has been verified. Then the operation of switching output terminals of the multi-output light source unit 115 and that of verifying the output positions of the respective cores can automatically be repeated by the CPU 118, so that not only measurement time but also errors in measurement become reducible.

In addition, still other forms of the invention may be adopted without departing from the spirit and scope thereof and the modified examples thereof mentioned above may selectively be adopted as occasion demands.

As set forth above, the first aspect of the present invention is such that the multi-core optical fiber inspecting method comprises the steps of putting an optical signal into each incident end core of a multi-core optical fiber having a plurality of cores arranged in one plane, taking out the optical signal emitted from the emission end of the core in a time series mode according to the alignment order of emission-side cores of the multi-core optical fiber, and verifying core numbers of the respective cores of the optical fiber on the basis of the signal patterns thus taken out in the time series mode. Therefore, the coincidence between the alignment order of the input-side cores of the multi-core optical fiber and the alignment order of the output-side cores thereof can be verified simply, quickly and accurately.

According to the second aspect of the present invention, when the core numbers of the respective cores of the multi-core optical fiber are verified, the power of each of the optical signals put into and emitted from the multi-core optical fiber is measured whereby to measure the transmission loss of the multi-core optical fiber. It is therefore possible to confirm the coincidence between the alignment order of the input-side cores of the multi-core optical fiber and the alignment order of the output-side cores thereof and to measure the transmission loss of the optical fiber as its basic characteristic in one step simply, quickly and accurately.

According to the third aspect of the present invention, in the multi-core optical fiber inspecting apparatus, the multi-core optical fiber having the plurality of cores arranged in one plane, comprises: the light source having the plurality of optical output terminals which are connected to the incident ends of the respective cores of the multi-core optical fiber and used for putting optical signals into the respective cores thereof; the optical signal taking means for taking out the optical signal emitted from the emission end of each core of the multi-core optical fiber in the time series mode according to the alignment order of emission-side cores of the multi-core optical fiber; the optical signal detecting means for detecting the optical signal thus taken out by the optical signal taking means; and the signal processing means for verifying core numbers of the respective cores of the multi-core optical fiber on the basis of the signal patterns of detection outputs of the optical signal detecting means. Therefore, the coincidence between the alignment order of the input-side cores of the multi-core optical fiber and the alignment order of the output-side cores thereof can be confirmed simply, quickly and accurately.

According to the fourth aspect of the present invention, in the multi-core optical fiber inspecting apparatus, the optical signal taking means has the rotary plate formed with the opening of a size large enough to totally let pass all the optical signals emitted from the respective cores of the multi-core optical fiber, and the optical signal detecting means includes the light receiving element having an area large enough to collectively receive all the optical signals emitted from the respective cores of the multi-core optical fiber. It is therefore possible to confirm the coincidence between the alignment order of the input-side cores of the multi-core optical fiber and the alignment order of the output-side cores thereof and to measure the transmission loss of the optical fiber as its basic characteristic in one step simply, quickly and accurately.

According to the fifth aspect of the present invention, in the multi-core optical fiber inspecting apparatus, the multi-core optical fiber having the plurality of cores arranged in one plane, comprises: the multi-output light source unit having the plurality of optical output terminals which are connected to the incident ends of the respective cores of the multi-core optical fiber and used for putting optical signals into the respective cores thereof; the rotary plate having at least one slit which is driven to rotate in such a way as to cross the optical beam emitted from the emission end of each core of the multi-core optical fiber; the optical signal detecting means for detecting the optical signal emitted from the emission end of each core of the multi-core optical fiber as the time series signal according to the alignment order of emission-side cores of the multi-core optical fiber; and the signal processing means for verifying core numbers of the respective cores of the multi-core optical fiber on the basis of the signal patterns of the time series signals emitted by the optical signal detecting means. Therefore, the coincidence between the alignment order of the input-side cores of the multi-core optical fiber and the alignment order of the output-side cores thereof can be confirmed simply, quickly and accurately.

According to the sixth aspect of the present invention, in the multi-core optical fiber inspecting apparatus, the rotary plate has the opening other than the slit, the opening being large enough to let pass the optical beam outputs of all the cores of the multi-core optical fiber; the optical signal detecting means includes the large-diameter optical sensor capable of receiving the optical beam outputs of all the cores of the multi-core optical fiber; and the signal processing means obtains the transmission loss of the multi-core optical fiber on the basis of detection outputs of the optical sensor that has received the optical beam outputs of the multi-core optical fiber that have passed through the opening of the rotary plate. It is therefore possible to confirm the coincidence between the alignment order of the input-side cores of the multi-core optical fiber and the alignment order of the output-side cores thereof and to measure the transmission loss of the optical fiber as its basic characteristic in one step simply, quickly and accurately.

According to the seventh aspect of the present invention, as the signal processing means verifies the core number by measuring the time required until the slit passes the front of the emission end of each core of the multi-core optical fiber whose core number is to be verified after the slit passes through the optical path formed by the photocoupler, the core-to-core positional relationship of the multi-core optical fiber is determined with the position of the photocoupler thus disposed as a reference. Then there is sequentially created a condition in which the optical signal is produced in the time series mode from only the target core in order to verify its core number by measuring the time required until the slit passes the front of the emission end of the target core of the multi-core optical fiber 30 after it passes through the optical path formed by the photocoupler. Thus, the core number can be verified simply, quickly and accurately.

According to the eighth aspect of the present invention, in the multi-core optical fiber inspecting apparatus described in either claim 5 or claim 6, the multi-output light source unit is so arranged as to be able to control the level of the optical output put into each core of the multi-core optical fiber and to cut off only the optical output put into the core of the multi-core optical fiber whose core number is targeted for verification, and the signal processing means verifies the core number of the multi-core optical fiber on the basis of the signal pattern of the time series signal detected by the optical signal detecting means when the slit of the rotary plate passes the front of the emission end of each core of the multi-core optical fiber. Therefore, the coincidence between the alignment order of the input-side cores of the multi-core optical fiber and the alignment order of the output-side cores thereof can be confirmed simply, quickly and accurately.

According to the ninth aspect of the present invention, in the multi-core optical fiber inspecting apparatus, the multi-output light source unit is so arranged as to be able to control the level of the optical output put into each core of the multi-core optical fiber and to increase or decrease only the optical output put into the core of the multi-core optical fiber whose core number is targeted for verification; the optical signal detecting means including: the photodiode for detecting the optical signal emitted from the emission end of each core of the multi-core optical fiber; the current-voltage converter circuit for converting the output current of the photodiode into a voltage signal; and two of the first and second comparator different in the reference voltage with the output signal of the current-voltage converter circuit as an input; the output condition of the first comparator is set as a condition for detecting the optical signals supplied from all the cores of the multi-core optical fiber; the output condition of the second comparator is set as a condition for detecting only the optical signal supplied from the core of the multi-core optical fiber whose core number is targeted for verification, and the signal processing means verifies the core number of the multi-core optical fiber on the basis of the outputs of the first and second comparators. Therefore, the coincidence between the alignment order of the input-side cores of the multi-core optical fiber and the alignment order of the output-side cores thereof can be confirmed simply, quickly and accurately.

According to the tenth aspect of the present invention, the optical signals are put into the respective cores of the multi-core optical fiber by the multi-output light source unit of the aforementioned multi-core optical fiber core-number verifying apparatus. The outputs of the respective cores of the multi-core optical fiber are detected by the light receiving means and the image thus detected thereby is processed so as to recognize any one of the cores of the multi-core optical fiber from which the optical signal has been detected. Consequently, the output light beams from the output side of the multi-core optical fiber can collectively be recognized from the image, and this arrangement is different from the conventional arrangement and makes unnecessary the work of verifying the output cores of the multi-core optical fiber separately. It is therefore possible to facilitate, and shorten the time required for, the verifying work, whereby the reliability of test results can greatly be improved.

According to the eleventh and twelfth aspects of the present invention, in the multi-core optical fiber core-number verifying apparatus, the utilization of infrared beams allows distinguishing between the cores clearly from the image data thus photographed without any influence of external light. Thus, the measurement accuracy becomes improvable.

According to the thirteenth and fourteenth aspects of the present invention, as the multi-core optical fiber core-number verifying apparatus includes the plurality of light sources or the light switching device capable of converting the output light of the light source into the plurality of output light beams, putting the optical signals selectively into the respective cores of the multi-core optical fiber can be carried out easily and quickly, whereby the measurement time can be shortened further.

According to the fifteenth aspect of the present invention, as the multi-core optical fiber core-number verifying apparatus further includes: the input switching means capable of controlling the multi-output light source unit as to switching cores to be fed with an optical signal, and the core coincidence decision means used to decide whether or not the core targeted by the input switching means as what is fed with an optical signal coincides with the core from which an optical signal output has been detected by the emission-position monitoring means. With this arrangement, the work of confirming the coincidence between the alignment order of input cores and the alignment order of output cores that of verifying the output positions of the respective cores can automatically be repeated by the CPU 118, so that not only measurement time but also errors in measurement become reducible.

What is claimed is:

1. A multi-core optical fiber inspecting apparatus for a multi-core optical fiber core-member having a plurality of cores arranged in one plane comprising:

a multi-output light source unit having a plurality of output terminals for putting an optical signal into an end of each of the plurality of cores of the multi-core optical fiber;

light receiving means for detecting the optical signal emitted from an other end of each of the plurality of cores as an image data; and emission-position monitoring means connected to the light receiving means, the emission-position monitoring means for processing image data obtainable from the light receiving means to determined which core of the multi-core optical fiber emits the optical signal.

2. The multi-core optical fiber inspecting apparatus as claimed in claim 1, wherein an infrared beam is used for the optical signal and wherein an infrared camera is used as the light receiving means.

3. The multi-core optical fiber inspecting apparatus as claimed in claim 1, wherein an infrared beam is used for the optical signal; and the light receiving means includes:

an infrared sensor plate for converting the infrared beam into visible light; and a camera for photographing the infrared sensor plate.

4. The multi-core optical fiber inspecting apparatus as claimed in claim 1, the multi-output light source unit including:
  at least one light source emitting light; and
  a light switching device converting the light into a plurality of output light beams.

5. The multi-core optical fiber inspecting apparatus as claimed in claim 1,
  the multi-output light source unit has a plurality of light sources each producing one output light beam.

6. The multi-core optical fiber core-number verifying apparatus as claimed in claim 1, including:
  input switching means connected to the multi-output light source unit, the input switching means for switching one of the plurality of cores to be fed with the optical signal from the multi-output light source unit, and
  core coincidence decision means connected to the input switching means and the emission-position monitoring means, the core coincidence decision means for deciding whether or not the one of the plurality of cores targeted by the input switching means to be fed with the optical signal is the same as the core from which an optical signal output has been detected by the emission-position monitoring means.

* * * * *